Patented Jan. 26, 1937

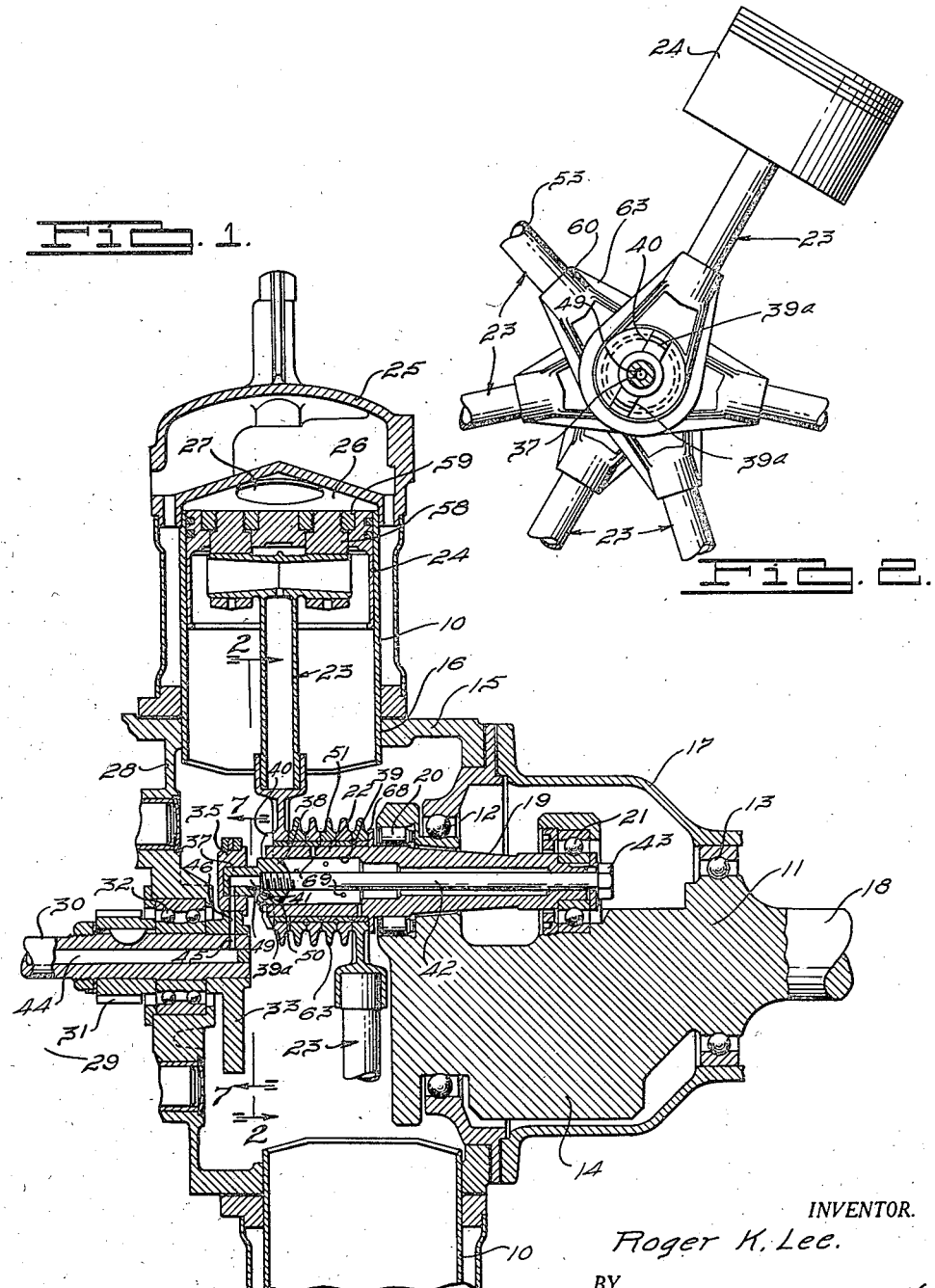

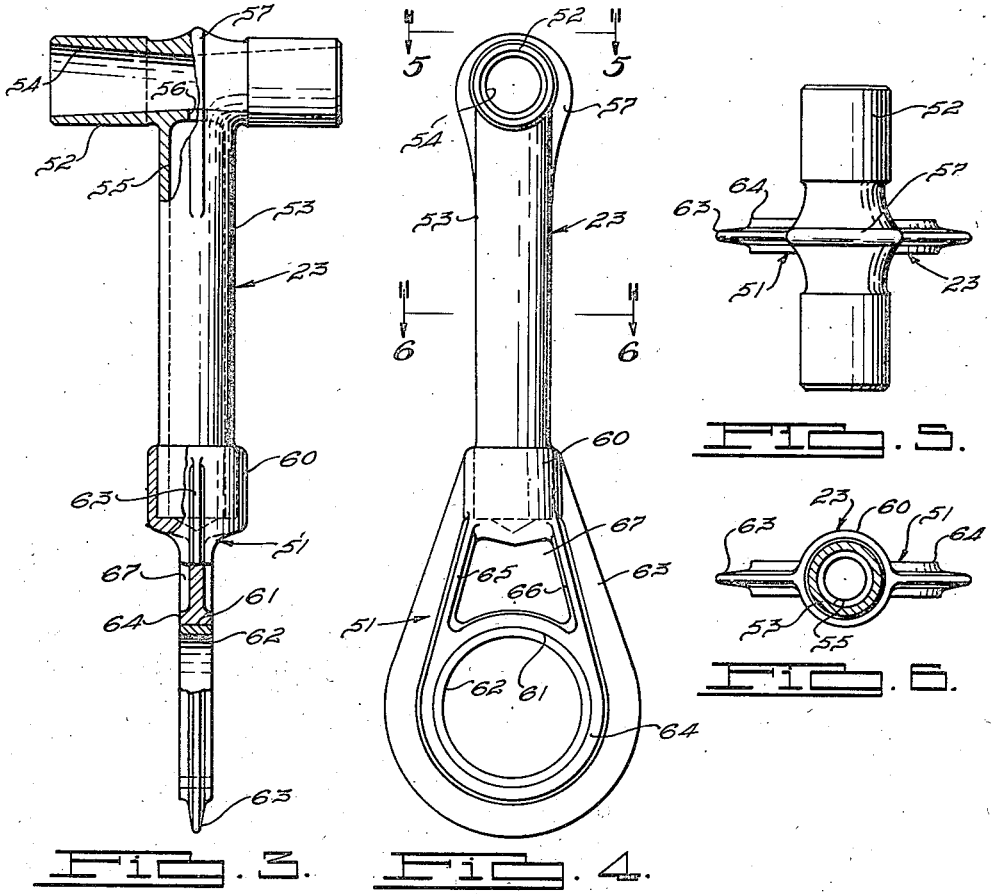
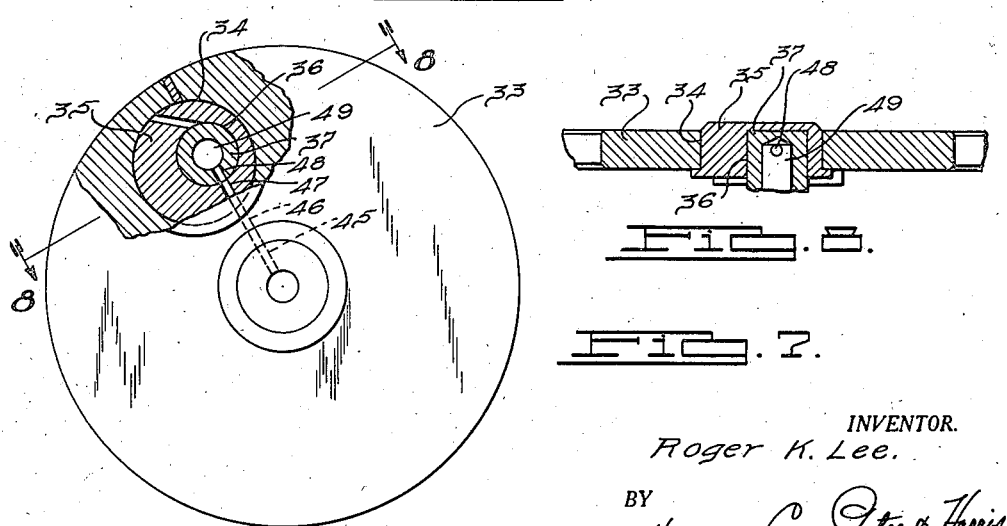

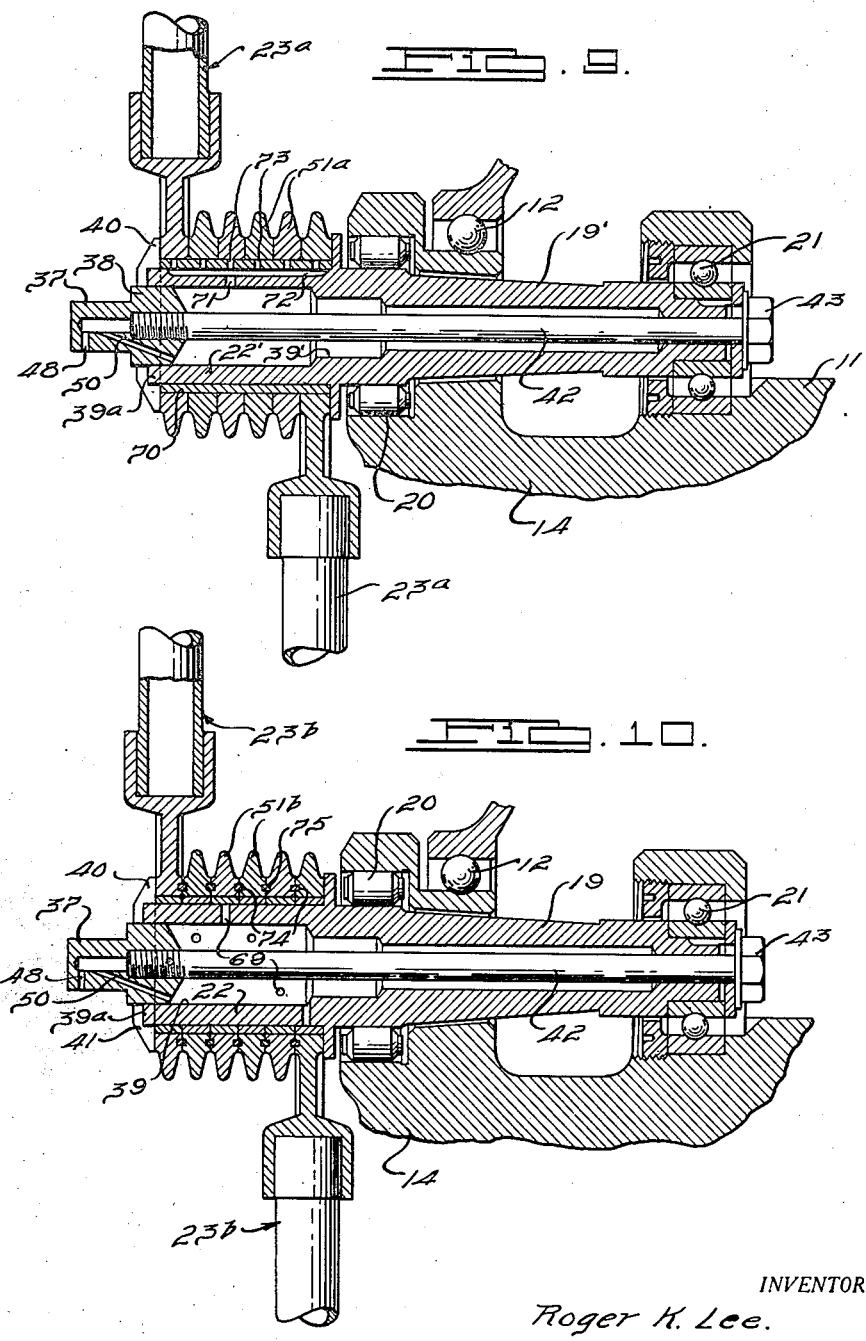

2,068,750

UNITED STATES PATENT OFFICE 2,068,750

INTERNAL COMBUSTION ENGINE

Roger K. Lee, Highland Park, Mich., assignor to Chrysler Corporation, Detroit, Mich., a corporation of Delaware Application June 13, 1934, Serial No. 730,434

21 Claims. (Cl. 74—580)

This invention relates to internal combustion engines and refers more particularly to improvements in means for transmitting power from the engine piston or pistons to the crankshaft, and to improved mechanism associated therewith.

It is an object of my invention to provide an improved connecting rod structure and an improved assembly of connecting rods and crank pin or other operated device whereby the engine may be successfully operated at speeds materially higher than the usual speeds of conventional engines used for driving motor vehicles, for example. While my improvements are not necessarily limited in their application to such high speed engines or to engines for driving motor vehicles, they are particularly adapted to such applications.

A further object of my invention is to provide an improved connecting rod of unusually light weight, at the same time affording the strength requisite for engine operation especially at relatively high speeds.

Another object of my invention is to provide an improved connecting rod assembly particularly adapted to engines having radially arranged cylinders wherein the connecting rod bearings may be relatively small and compactly arranged in a novel and improved manner in association with each other and with the crank pin operated thereby.

The desired increase in engine speeds over conventional practice is, among other things, limited by the loads produced by the weight of the reciprocating parts experienced at the connecting rod bearings, such loads greatly increasing in magnitude as the piston speed increases and a further object of my invention is to overcome the aforesaid difficulties limiting engine operation at relatively high speeds.

Another object of my invention, in its somewhat more limited aspects, is to provide an improved connecting rod or rod assembly acting on a cantilever crank or crank pin, the crank pin being preferably mounted for rotation on its axis relative to the crankshaft rotation as the crank pin is rotatably displaced by the connecting rods to rotate the crankshaft. Such arrangement permits the connecting rods to be made of unusually light weight and to thereby minimize the forces produced by the reciprocation of the connecting rods.

Another object of my invention is to provide a connecting rod and crank pin assembly wherein the rod bearings may be made unusually small for a given load. Thus, I have provided a crank pin adapted to substantially move with or assume the angular velocity of whichever connecting rod exerts the greatest instantaneous force on the crank pin, the crank pin assuming the angular velocity independently of the crankshaft rotation.

In a modified form of my invention I have provided a bushing intermediate the crank pin and rod bearings adapted to transmit the aforesaid rod forces to the crank pin, the bushing having a further desirable characteristic in minimizing oil throwing at the rod bearings and hence oil consumption by the engine.

Another object of my invention resides in the provision of an improved lubricating system and oil control for the connecting rod bearings of an engine particularly of the radial cylinder type.

An added object of my invention is to provide an improved crank pin and connecting rod assembly wherein the crank pin has rotation about its axis relative to its rotational displacement with the crankshaft and relative to each of the rods associated therewith, the crankpin preferably successively rotating with each of the connecting rods relative to the crankshaft during the operation of the engine.

Still further objects of my invention are to provide an improved connecting rod structure wherein the rod is formed with a solid or unitary bearing of improved construction; to provide an improved connecting rod structure having a piston pin carried preferably as a unitary structural part of the main rod portion; and to provide an improved two-piece connecting rod having component parts thereof securely connected to form a unitary structure comprising a bearing portion and a main rod portion.

Another object of my invention is to provide a unitary piston and connecting rod structure and to provide a circular unitary connecting rod bearing portion free from customary caps and cap securing bolts, the bearing portion being preferably attached by welding for added lightness of weight to the main rod portion of the connecting rod structure. The bearing may be constructed relatively thin and is reinforced in a novel manner to carry the loads during engine operation.

An additional object of my invention is to provide an improved connecting rod assembly including a driving pin or equivalent element for actuating a mechanism associated with the engine such as the valve mechanism by way of example.

Further objects and advantages of my invention will be more apparent from the following detail description of several illustrative embodiments thereof, reference being had to the accompanying drawings in which:

Fig. 1 is a sectional elevational view longitudinally through my engine, the section being taken along one of the cylinders of the six-cylinder radial engine illustrated therein.

Fig. 2 is a sectional elevational view of my connecting rod and crank pin assembly for the engine illustrated in Fig. 1, the section being taken along the line 2—2 of Fig. 1.

Fig. 3 is an enlarged side elevational view of the typical connecting rod structure illustrated in Fig. 1, parts of the structure being broken away to illustrate the details of construction.

Fig. 4 is a front elevational view of the connecting rod structure illustrated in Fig. 3.

Fig. 5 is a top plan view of the connecting rod structure shown in Figs. 3 and 4, the view being taken as indicated by the line 5—5 in Fig. 4.

Fig. 6 is a detail sectional view through the connecting rod structure shown in Fig. 4, the view being taken along the line 6—6 of Fig. 4.

Fig. 7 is a detail sectional view through the valve gear drive pin, the section being taken along the line 7—7 of Fig. 1.

Fig. 8 is a detail sectional view taken along the line 8—8 of Fig. 7.

Fig. 9 is a detail sectional view through a crank pin and connecting rod assembly illustrating a modified form of my invention.

Fig. 10 is a detail sectional view through a crank pin and connecting rod assembly illustrating a further modified form of my invention.

Referring to the drawings, I have illustrated my improvements in an internal combustion engine of the type having a plurality of cylinders 10 radially arranged with respect to the engine crankshaft 11 which is rotatably journaled by longitudinally spaced front and rear bearings 12 and 13 respectively. The particular engine shown for purposes of illustration is a six-cylinder radial type although obviously my invention in its broader aspects is not necessarily limited to an engine of the radial type or to an engine having any set number of cylinders.

The crankshaft 11 may be appropriately counterweighted as generally indicated at 14, the forward portion of the crankshaft projecting into the substantially cylindrical crankcase structure 15, the latter being provided with circumferentially spaced openings 16 concentric with and adapted to receive the respective cylinders 10. The rear portion of the crankshaft 11 projects through the crankcase extension cover 17, which supports the aforesaid rear bearing 13, to provide a power take-off 18 for driving the motor vehicle or for operating such other machine or device as may be desired.

The crankshaft 11 is provided with a crank or crank pin 19 which, according to the present illustrated embodiment of my invention, is journaled for rotation of its axis relative to the crankshaft during rotary displacement of the crank pin by reason of the forward and rear anti-friction type bearings 20 and 21 respectively. The crank pin 19 is preferably of the cantilever type having a cantilever portion thereof 22 which projects forwardly of the crankshaft 11 and into the crankcase 15 for operation by the connecting rods 23, these rods extending radially outwardly from the crank pin for connection to the respective pistons 24 operating in the aforesaid cylinders 10.

Each cylinder 10 is provided with a suitable cylinder head structure 25 forming a combustion chamber 26, one of the valves associated therewith being illustrated at 27 in Fig. 1. The intake and exhaust gases may be passed to and from the combustion chamber 26 during operation of each cylinder of the engine in any suitable manner as will be readily understood in the art.

A wall 28 extends transversely of the crankcase 15 and is adapted to provide a valve operating chamber 29 forwardly of or to the left of the wall 28 as viewed in Fig. 1.

The valve operating mechanism (not shown) which may be located in the chamber 29 is adapted to be driven from a driving shaft 30 provided with a drive pinion 31, the shaft being rotatably journaled at 32 in the wall 28 and having a portion thereof projecting rearwardly into the crankcase 15 for mounting a disc 33 adapted to drive the shaft 30. This valve gear driving disc 33 as best seen in Figs. 7 and 8 is provided with an opening 34 adapted to receive a bushing 35, the bushing and disc being capable of a slight amount of relative rotational movement as will be presently apparent. The bushing 35 has an opening 36 eccentric with the opening 34, the opening 36 being rotatably engaged by the forwardly projecting end of a driving pin 37, this pin being provided with a rearward enlarged portion 38 thereof fitting within the forwardly opening bore 39 of the crank pin 19.

The driving pin 36 is locked in place with the crank pin 19 by engagement of the diametrically spaced crank pin projections 39a which extend into radially extending slots 40 formed in the annular flange 41 which is a part of the drive pin portion 38. The projections 39a and slots 40 are best seen in Figs. 1 and 2.

In order to clamp the driving pin 36 in position and also to maintain the connecting rod assembly against axial displacement of the crank pin as will be presently apparent, I have provided the clamping rod 42 which extends axially through the bore of the crank pin for threaded engagement at its forward end with the aforesaid drive pin portion 38, the rear end of the rod 42 extending rearwardly beyond the crank pin rear bearing 21 for receiving a clamping nut 43 which reacts against the rear end face of the crank pin 19 as will be apparent from Fig. 1.

By reason of the eccentricity between the centers of the openings 34 and 36 of the bushing 35, it will be apparent that the disc 33 will not take any of the load of the crank pin 19, the disc 33 having only rotation with the crankshaft 11 since any tendency of the crank pin to load the disc 33 and shaft 30 will be compensated for by a slight rotative movement of the bushing 35 in the opening 34. The shaft 30 has its axis coinciding with the axis of the crankshaft 11.

In order to provide a convenient means of changing the relative timing in the drive between the crank pin 19 and the shaft 30, it will be apparent that the bushing 34 may be rotated through an angle of 180 degrees when the disc 33 is disconnected from the bushing 35, this rotation of the bushing serving to alter the timing between the crank pin and shaft 30.

In order to supply lubricating oil to the crank pin 19 under pressure from a suitable source of supply, the shaft 30 has an axial oil conducting passage 44 closed at its crankcase end adjacent which the shaft is provided with a radial communicating passage 45 registering with a radial passage 46 in the disc 33. The passage 46 registers with one of the passages 47 in the bushing 35 depending upon the position of adjustment of this bushing as aforesaid and the passage 47 in turn registers with a radial passage 48 in the drive pin 36, the latter having an axial lubricant conducting passage 49 adapted to conduct the lubricant to the aforesaid bore 39 of the crank pin 19 by reason of a further passage 50 best shown in Fig. 1 as extending through the enlarged drive pin portion 38. The distribution of the lubricant from the bore of the crank pin to the bearings of the connecting rods will be presently described.

The pistons 24, cylinders 10, cylinder heads 25, valves 27, and valve operating mechanism in general do not in themselves constitute a part of my invention as claimed in this application, such parts being described and claimed in other of my co-pending applications and I desire to point out that such parts may be of any desired construction and arrangement within keeping of the general objects and spirit of my invention.

Each of the aforesaid connecting rod structures 23, best illustrated in Figs. 3 to 6, is preferably of forged steel and, according to the present illustrated embodiment of my invention, comprises a lower or inner solid or unitary annular bearing portion 51 and an outer or upper portion consisting of the piston pin 52 and the main rod portion 53. The connecting rod structure is thus constructed for a maximum of strength and a minimum of weight.

The piston pin portion 52 has a bore 54 extending therethrough and the main rod portion 53 at right angles thereto also has a bore 55 axially thereof, these bores communicating by an oil hole 56. A reinforcing flange 57 extends outwardly from opposite sides of the main rod portion 53 adjacent the pin 52, the flange 57 preferably lying substantially in the plane of the relatively flat bearing portion 51 and surrounding the upper central portion of the pin 52 for strengthening the T-joint formed by the pin and main rod portions.

Each piston pin 54 may be suitably connected with an associated piston 24, the construction illustrated including a pair of piston pin bosses 58 adapted for assembly on the piston pin and then inserted into suitable openings in the head of the piston and secured thereto in an appropriate manner which may include the clamping members 59.

The inner end of the main rod portion 53 has a cylindrical bearing adapted on assembly with the bearing portion 51 to closely fit in the upwardly or outwardly opening socket 60, the joint thus formed being copper hydrogen welded to form a permanent or unitary structure.

Below the socket 60 the bearing portion 51 has an enlarged portion of relatively thin cross section in the direction of the axis of the crank pin 19 and transversely of the piston pin 52 in order to provide the opening 61. The opening 61 may receive a bushing 62 fixed within the opening, the bushing, in turn, receiving the crank pin 19. In order to lend strength and rigidity to the bearing portion and to prevent any distortion of the crank pin receiving opening thereof in response to the operating forces acting through the main rod portion 23, I have provided the strengthening flange 63 which extends outwardly preferably from opposite sides of the outer ends of socket 60 and around the crank pin receiving opening in the bearing portion. Extending at right angles to the flange 63, the opening 61 is bounded on each side face of the bearing portion 51 with an annular web or flange 64 and the spaced flanges or ribs 65 and 66 which extend between the inner end of the socket 60 and the annular flange 64 surrounding the crank pin receiving opening. Intermediate the flanges 64, 65 and 66 the opposite faces of the bearing portion is provided with the depressions 67 as best seen in Figs. 3 and 4.

It will be noted that the flanges 65, 66 and the annular flange 64 at each side face of the bearing portion 51 are compression members, which take the column load in the main rod portion 53 and distribute this load around the bearing opening. The flange 63 is primarily a shear member, all of the flanges cooperating to resist the stresses and prevent distortion of the bearing opening.

The relatively thin one-piece bearing portion is especially desirable in permitting a plurality of connecting rod assemblies to engage a single crank pin which may be of cantilever form in the case of radially arranged engine cylinders as illustrated in my drawings, although my invention is not limited in its useful and improved applications to any particular type of engine.

Referring to Figs. 1 and 2, I have illustrated one manner of assembly of my connecting rods on the cantilever portion 22 of the crank pin 19, the flat side faces of adjacent connecting rod bearing portions 51 being preferably in relative rotative engagement and the various bearing portions are held in assembly on the crank pin by reason of the aforesaid clamping rod 42 and annular flange 40 acting in conjunction with the rearwardly spaced annular flange or abutment 68 carried by the crank pin 19.

At each point of engagement of the crank pin 19 with the respective connecting rod bearing portions, the portion 22 of the crank pin is provided with a radially extending passage 69 adapted to conduct the lubricant under pressure from the crank pin bore 39 to the engaged surfaces of the crank pin and connecting rods. The openings 69 are preferably axially and circumferentially spaced from each other as illustrated in Fig. 1 and these openings preferably register with the central portions of the bushings 62 intermediate the side faces of the connecting rod bearing portions, whereby the lubricating oil is substantially prevented from escape in an excess degree outwardly of the crank pin 19 intermediate the engaged side faces of the adjacent connecting rod bearing portions.

During operation of the engine the explosive fuel mixture in the various combustion chambers 26 of cylinders 10 is successively fired in a manner which is well understood in the art, the connecting rods 23 thereby successively transmitting the forces in properly timed sequence to the crank pin 19 for rotatably actuating the crankshaft 11. Inasmuch as the crank pin 19 is freely rotatable about its axis relative to crankshaft 11 during rotational displacement of the crank pin, and inasmuch as the various bearings of the connecting rods are rotatable with respect to the crank pin, it will be apparent that the crank pin is free to assume the angular velocity of any of said connecting rods independently of the rotation of the crankshaft. In other words, the crank pin is adapted to rotate relative to its rotational displacement and with whichever of the connecting rods exerts the greatest instantaneous load on the crank pin during operation of the engine. The connecting rods will thereby successively induce rotational displacement of the crank pin therewith accompanied with rotation of the crank pin on its axis relative to each of the remaining connecting rods other than the connecting rod inducing the displacement.

It will therefore be apparent that the so-called PV or pressure velocity factor between each connecting rod and the crank pin is materially reduced by reason of my minimizing the velocity component of this factor and such arrangement contributes materially to my relatively light weight connecting rod structure and particularly in connection with the relatively small bearing areas necessary at each of the connecting rod bearing portions 51 for satisfactorily carrying the load from the pistons 24 to the crank pin 19. This load may be conveniently and readily taken care of by reason of the bearings 20 and 21 supporting the crank pin 19 and also by reason of the bearings 12 and 13 supporting the crankshaft 11.

As an illustration of the compact arrangement of the connecting rods on my crank pin 19, it will be noted that in the six-cylinder radial engine illustrated in my drawings, the group of connecting rod bearing portions are relatively spaced axially of the crank pin and lie substantially within the projection of a radius of one of the cylinders 10 as will be readily apparent from Fig. 1. In Fig. 1 the main rod portions 53 are coplanar with their respective associated cylinders 10, the bearing portion 51 of each rod being also coplanar with its associated main rod portion whereby the axes of the various cylinders 10 are circumferentially and axially spaced, adjacent cylinders being axially spaced an amount corresponding to the spacing of adjacent bearing portions of the connecting rods at the mounting on the cantilever portion 22 of the crank pin 19.

I have determined that engine speeds of 5,000 to even 10,000 R. P. M. are possible by utilizing my inventions although it will be understood that such values of engine R. P. M. are cited herein for illustrative purposes in order to illustrate the unusual operating characteristics of my improvements and such values in practice may be varied as desired.

Referring now to the modified form of my invention illustrated in Fig. 9, it will be apparent that I have illustrated only a portion of an engine having the crank pin 19′ in association with the connecting rods 23ª, it being understood that the crank pin 19′ is adapted for use in the engine shown in Fig. 1. In Fig. 9 the connecting rod bearing portions 51ª do not directly engage the cantilever portion 22′ of the crank pin 18′ since I have interposed a sleeve or bushing 70 intermediate the crank pin portion 22′ and the annular bearings of the connecting rods. It will also be noted that in Fig. 9 the bearing portions 51ª have their bearing openings directly engageable with the sleeve 70, this sleeve taking the place of the individual bushings 62 of the Fig. 1 embodiment. Thus, the sleeve bushing 70 is separate from the crank pin 18′ and each of these parts may be made of materials best suited to their respective requirements, the crank pin having the necessary strength and the bushing having the desired bearing qualities.

This bushing 70 is capable of relative rotation with respect to the crank pin portion and also with respect to the connecting rod bearing portions; it being apparent that a similar action will take place between the crank pin 19′ and the connecting rods 23 as was previously described in connection with the crank pin 19 and connecting rods 23 of the Fig. 1 embodiment with the exception that in Fig. 9 the forces transmitted through the connecting rods will successively act on the crank pin through the intermediary of the bushing 70.

Thus, the connecting rod which exerts the greatest instantaneous pressure on the crank pin will, at such time, urge the bushing 70 to rotate with such connecting rod (and relatively with respect to the remaining rods) and the bushing 70 in turn will urge the crank pin 19′ to assume the angular velocity of the bushing. Therefore, in both Figs. 1 and 9, the connecting rods are mounted on the cantilever type crank pin and in both instances the crank pin is capable of rotation about its axis relative to the supporting crank shaft so that the resulting action between the crank pin and connecting rods is substantially the same in both instances.

The Fig. 9 embodiment has the further advantage of more efficiently controlling the distribution of the lubricating oil to the bearing portions of the connecting rods and for further preventing undue escape of the oil outwardly between the contacting side faces of adjacent connecting rod bearing portions in the following manner.

The crank pin 19′ has its bore 39′ supplied with lubricating oil in a suitable manner such as that previously described in connection with Fig. 1, the cantilever portion 22′ being provided with a radial port 71 opening outwardly to a longitudinally extending groove 72 provided in the surface of the crank pin portion 22′. The bushing 70 has a plurality of longitudinally spaced radially extending lubricant conducting ports or passages 73 respectively leading to the connecting rod bearing portions in engagement with the bushing 70. These bushing passages preferably lie respectively midway between the side faces of each of the connecting rod bearing portions in order to prevent direct passage of the lubricating oil from the passages 73 to the side faces of the connecting rod bearing portions. The bushing 70 will be periodically or successively rotatively advanced with the bearing portions of the various connecting rods and the bushing will, in turn, cause successive angular rotation therewith of the crank pin 19′, it being apparent that the crank pin groove 72 will periodically register with the bushing passages 73 to periodically supply a quantity of lubricating oil under pressure to the bearing portions of the connecting rods. If desired, additional grooves 72 may be provided as well as additional bushing passages 73 according to the requirements for lubrication in any particular instance as will be readily understood.

Referring to my Fig. 10 embodiment, the parts illustrated therein are identical in structure and operation to the Fig. 1 embodiment with the following exception. In Fig. 10 the adjacent connecting rods 23ᵇ are provided with annular grooves 74 in their side faces, adjacent grooves receiving the annular baffle rings 75 which baffle the side faces of engaging rod bearing portions against oil travel outwardly in excessive quantity. The rings 75 are relatively rotatable with respect to the grooves 74 receiving the respective rings and the rings are readily assembled axially of the crank pin or they may be split.

Various modifications and changes will be readily apparent from the teachings of my invention, as set forth in the appended claims, and it is not my intention to limit my invention to the particular details of construction and operation shown and described for illustrative purposes.

What I claim is:

1. In an engine having a crankshaft, a crank pin, a plurality of connecting rods successively exerting pressure on said crank pin, means for journalling said crank pin in said crankshaft for rotation relative to its rotational displacement with said crankshaft and with whichever of said connecting rods exerts the greatest instantaneous load thereon, each of said connecting rods having a load applying bearing portion rotatably engaging said crank pin independently of the load applying bearing portion of each other of said plurality of connecting rods.

2. In an internal combustion engine having a rotatable crankshaft, a cantilever crank pin rotatably journalled in said crankshaft and formed with a lubricant conducting passage, a plurality of radially arranged connecting rods having annular bearings through which said crank pin extends, adjacent bearings having side faces in engagement with each other, said crank pin having lubricant conducting means intermediate said passage and said bearings, and means for conducting lubricant from a source of supply to the free end of said cantilever crank pin for travel in said lubricant conducting passage toward the supported end of said cantilever crank pin.

3. In a connecting rod structure, a unitary annular bearing portion at one end of said structure, a main rod portion having one end thereof connected to said bearing portion, said bearing portion having a crank receiving cylindrical opening and a flange substantially surrounding said bearing portion in a plane containing the axis of the main rod portion, said flange being integrally formed with said bearing portion.

4. In a unitary connecting rod structure, a T-shaped portion providing a piston pin at one end thereof, a unitary bearing portion at the other end thereof, a main rod portion intermediate said piston pin and bearing portion, said bearing portion having a crank receiving cylindrical opening, a flange substantially surrounding said bearing portion in a plane containing the axis of the main rod portion, said bearing portion having additional flanges perpendicular to the aforesaid flange and projecting from the opposite faces of the bearing portion outwardly from said first flange, said bearing portion having a relatively thin cross section in the direction of the axis of said opening and lying substantially within the axial projection of the diameter of the main rod portion in said direction.

5. In an internal combustion engine, a rotatable crankshaft, a crank pin having its axis extending parallel to the crankshaft axis and being radially offset therefrom, means rotatably journalling said crank pin in said crankshaft for rotation relative to said crankshaft rotation, a plurality of connecting rods radiating from said crank pin and adapted to displace said crank pin, and means for mounting said connecting rods in operative association with said crank pin whereby said crank pin has rotation on its axis relative to all of the connecting rods associated therewith during operation of the engine.

6. In an internal combustion engine, a rotatable crankshaft, a crank pin having its axis extending parallel to the crankshaft axis and being radially offset therefrom, means rotatably journalling said crank pin in said crankshaft for rotation relative to said crankshaft rotation, a plurality of connecting rods radiating from said crank pin and adapted to displace said crank pin, and means for mounting said connecting rods independently of each other in operative association with said crank pin whereby said crank pin has rotation on its axis relative to all of the connecting rods operably associated therewith during operation of the engine.

7. In an internal combustion engine, a rotatable crankshaft, a crank pin having its axis extending parallel to the crankshaft axis and being radially offset therefrom, means rotatably journalling said crank pin in said crankshaft for rotation relative to said crankshaft rotation, a plurality of connecting rods radiating from said crank pin and adapted to displace said crank pin, each of said connecting rods having a bearing through which said crank pin extends for relative rotation therewithin, said bearings being adapted to successively load said crank pin during operation of the crankshaft to cause said crank pin to successively rotate on its axis with said bearings and relative to the crankshaft rotation.

8. In an internal combustion engine, a rotatable crankshaft, a crank pin having its axis extending parallel to the crankshaft axis and being radially offset therefrom, means rotatably journalling one end portion of said crank pin in said crankshaft for rotation relative to said crankshaft rotation, said crank pin having a cantilever portion extending from said crankshaft in the direction of said crank pin axis, a plurality of radially arranged connecting rods having annular bearings through which said cantilever crank pin portion extends, adjacent bearings having side faces in engagement with each other, said cantilever crank pin portion successively having rotation with each of said bearings and relative to the remaining bearings.

9. In an internal combustion engine, a rotatable crankshaft, a crank pin having its axis extending parallel to the crankshaft axis and being radially offset therefrom, means rotatably journalling one end portion of said crank pin in said crankshaft for rotation relative to said crankshaft rotation, said crank pin having a cantilever portion extending from said crankshaft in the direction of said crank pin axis, said crank pin being provided with an abutment, a plurality of connecting rods radiating from the cantilever portion of said crank pin, said connecting rods each having a bearing within which said crank pin cantilever portion extends, and means cooperating with said abutment for maintaining said bearings in position axially of said crank pin cantilever portion, each of said bearings having rotation with and with respect to said crank pin during operation of the engine.

10. In an internal combustion engine, a rotatable crankshaft, a crank pin having its axis extending parallel to the crankshaft axis and being radially offset therefrom, means rotatably journalling said crank pin in said crankshaft for rotation relative to said crankshaft rotation, a plurality of connecting rods radiating from said crank pin and adapted to displace said crank pin, and means for rotatably journalling said rods on said pin constructed and arranged to cause each of said rods to successively induce rotational displacement of said pin therewith accompanied with rotation of said pin on its axis relative to each of the remaining rods other than the rod inducing said displacement.

11. In an internal combustion engine, a rotatable crankshaft, a crank pin having its axis extending parallel to the crankshaft axis and being radially offset therefrom, means rotatably journalling one end portion of said crank pin in said crankshaft for rotation relative to said crankshaft rotation, said crank pin having a cantilever portion extending from said crankshaft in the direction of said crank pin axis, said crank pin being provided with an abutment, a plurality of connecting rods radiating from the cantilever portion of said crank pin, said connecting rods each having a bearing within which said crank pin cantilever portion extends, a valve gear drive pin carried by the free end of said crank pin cantilever portion, means carried by said drive pin spaced axially of said abutment and cooperating therewith to maintain said bearings in position axially of said crank pin cantilever portion, said crank pin having an axial bore extending through said cantilever end supported portions thereof and opening outwardly of said supported crank pin portions, and a bolt extending through said crank pin bore and engaging said drive pin for holding said drive pin in position.

12. In an internal combustion engine, a rotatable crankshaft, a crank pin having its axis extending parallel to the crankshaft axis and being radially offset therefrom, means rotatably journalling said crank pin in said crankshaft for rotation relative to said crankshaft rotation, a plurality of connecting rods successively exerting pressure on said crank pin, bushing means intermediate said connecting rods and crank pin, said bushing means being rotatable with respect to said rods and pin, said crank pin being adapted to rotate relative to its rotational displacement and with whichever of said connecting rods exerts the greatest instantaneous load thereon through the intermediary of said bushing means.

13. In an internal combustion engine, a rotatable crankshaft, a crank pin having its axis extending parallel to the crankshaft axis and being radially offset therefrom, means rotatably journalling one end portion of said crank pin in said crankshaft for rotation relative to said crankshaft rotation, said crank pin having a cantilever portion extending from said crankshaft in the direction of said crank pin axis, said crank pin being formed with a lubricant conducting passage, a plurality of radially arranged connecting rods having bearings through which said crank pin cantilever portion extends, bushing means mounting said bearings on said crank pin, means for conducting lubricant from a source of supply to the free end of said cantilever crank pin for travel in said lubricant conducting passage toward the supported end of said cantilever crank pin, and means for conducting lubricant from said passage outwardly of said bushing means to said bearings.

14. In an internal combustion engine, a rotatable crankshaft, a crank pin, means for rotatably journalling one end of said pin in said crankshaft with the other end thereof projecting as a cantilever from said crankshaft, said crank pin having an axial bore extending therethrough, a valve drive pin seated in said bore and projecting beyond the cantilever end of said crank pin, a securing member connected to said drive pin and extending within said bore to the journalled end of said crank pin, said securing member being spaced within said bore at the cantilever end of said crank pin to provide a lubricant conducting passage, said drive pin having a lubricant supply passage communicating with said lubricant conducting passage, a plurality of connecting rods radiating from the cantilever end of said crank pin, said cantilever end of said crank pin having one or more radial passages adapted to feed conduct lubricant from said lubricant conducting passage to said connecting rods.

15. In an internal combustion engine, a rotatable crankshaft, a crank pin, means for rotatably journalling one end of said pin in said crankshaft with the other end thereof projecting as a cantilever from said crankshaft, said crank pin having an axial bore extending therethrough, a valve drive pin seated in said bore and projecting beyond the cantilever end of said crank pin, a securing member connected to said drive pin and extending within said bore to the journalled end of said crank pin, said securing member being spaced within said bore at the cantilever end of said crank pin to provide a lubricant conducting passage, said drive pin having a lubricant supply passage communicating with said lubricant conducting passage, a plurality of connecting rods radiating from the cantilever end of said crank pin, said cantilever end of said crank pin having one or more radial passages adapted to feed conduct lubricant from said lubricant conducting passage to said connecting rods, said crank pin having an abutment adapted to limit movement of said connecting rods axially of the cantilever end of said crank pin in a direction toward said journalled end thereof, said drive pin having a radial flange projecting therefrom adjacent the cantilever end of said crank pin and adapted to limit movement of said connecting rods in a direction opposite to that aforesaid.

16. In an internal combustion engine, a rotatable crankshaft, a crank pin, means for rotatably journalling one end of said pin in said crankshaft with the other end thereof projecting as a cantilever from said crankshaft, said crank pin having an axial bore extending therethrough, a valve drive pin seated in said bore and projecting beyond the cantilever end of said crank pin, a securing member connected to said drive pin and extending within said bore to the journalled end of said crank pin, said securing member being spaced within said bore at the cantilever end of said crank pin to provide a lubricant conducting passage, said drive pin having a lubricant supply passage communicating with said lubricant conducting passage, a plurality of connecting rods radiating from the cantilever end of said crank pin, said cantilever end of said crank pin having one or more radial passages adapted to feed conduct lubricant from said lubricant conducting passage to said connecting rods, said crank pin having an abutment adapted to limit movement of said connecting rods axially of the cantilever end thereof, said drive pin having a radial flange projecting therefrom adjacent the cantilever end of said crank pin and adapted to limit movement of said connecting rods in a direction opposite to that aforesaid, said crank pin having a radial slot in the cantilever end thereof, said drive pin flange being disposed in said slot for nonrotatably securing said drive pin to said crank pin.

17. In an internal combustion engine, a rotatable crankshaft, a crank pin having its axis extending parallel to the crankshaft axis and being radially offset therefrom, means rotatably journalling one end portion of said crank pin in said crankshaft for rotation relative to said crankshaft rotation, said crank pin having a cantilever portion extending from said crankshaft in the direction of said crank pin axis, a plurality of connecting rods successively exerting pressure on said cantilever crank pin portion, each of said connecting rods having an end bearing portion through which said cantilever crank pin portion extends, and bushing means disposed between and rotatable relative to said cantilever crank pin portion and said rod bearing portions.

18. In an engine having a rotatable crankshaft, a crank pin, means for mounting said crank pin on said crankshaft for rotation relative to the crankshaft, a plurality of connecting rods, and means for rotatably mounting said connecting rods on said crank pin for rotation relatively thereto and with respect to each other whereby said crank pin is free to assume the angular velocity of any of said connecting rods independently of the rotation of the crankshaft.

19. In an engine having a rotatable crankshaft, a crank pin, means for mounting said crank pin on said crankshaft for rotation relative to the crankshaft, a plurality of connecting rods, and bushing means for rotatably mounting said connecting rods on said crank pin for rotation relatively thereto and with respect to each other whereby said crank pin is free to assume the angular velocity of any of said connecting rods independently of the rotation of the crankshaft.

20. In an engine having a crank pin, means for mounting said crank pin for rotation about its axis relative to its rotational displacement, a plurality of connecting rods, means for rotatably journalling said connecting rods on said crank pin for rotation thereon independently of each other and with respect to said crank pin to successively rotate said crank pin with each of said connecting rods and relative to the remainder of said connecting rods.

21. In an engine having a crankshaft, a crank pin, a plurality of connecting rods, means mounting said connecting rods on said crank pin for rotation relative to said crank pin and relative to each other and so constructed and arranged as to successively exert pressure on said crank pin, and means for journalling said crank pin in said crankshaft for rotation relative to its rotational displacement with said crankshaft and with whichever of said connecting rods exerts the greatest instantaneous load thereon.

ROGER K. LEE.